No. 768,875. PATENTED AUG. 30, 1904.
W. H. BROWN & J. E. TRUCKSES.
LIQUID DIRECTING DEVICE.
APPLICATION FILED SEPT. 17, 1903.
NO MODEL.
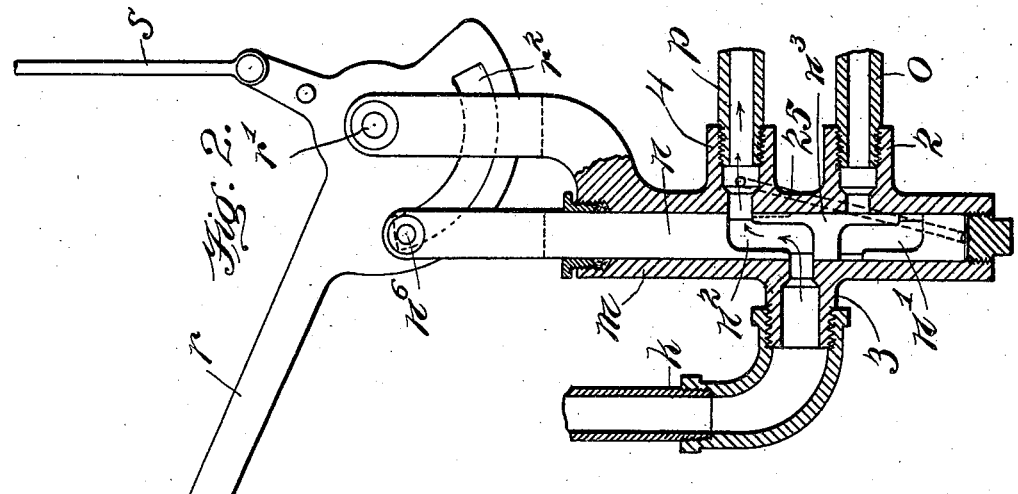
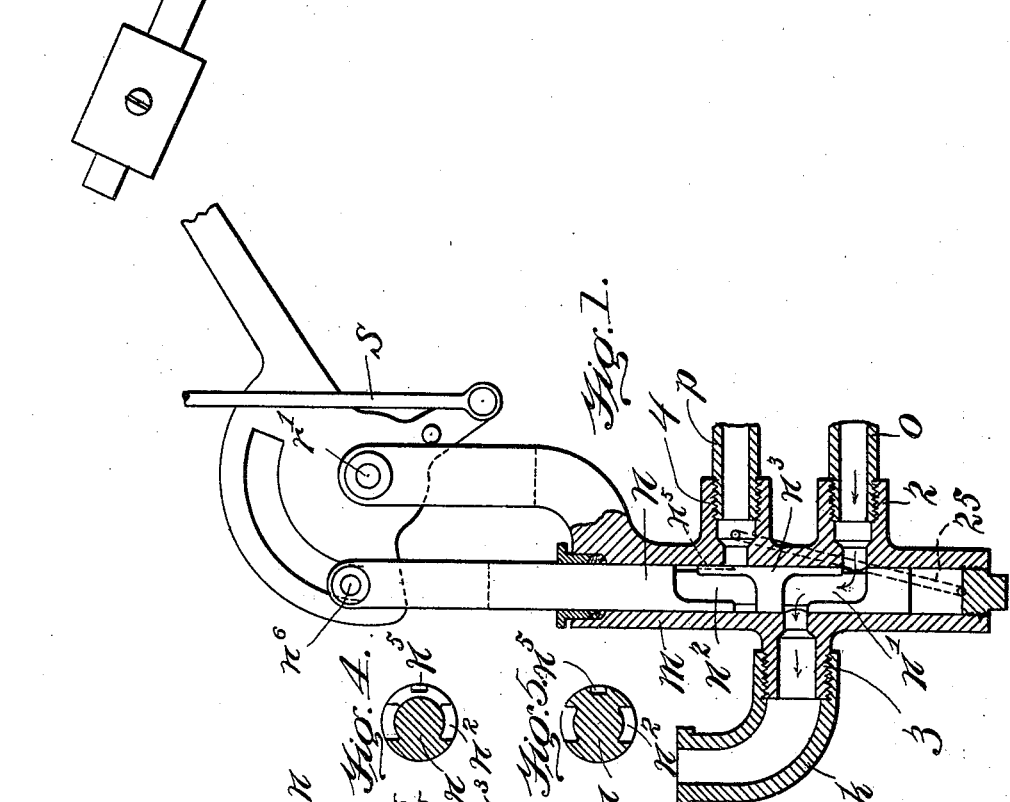
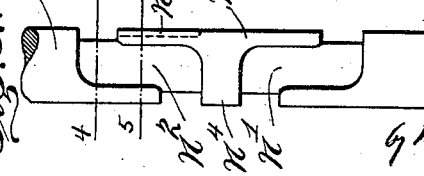
Witnesses:
R. Bullock.
E. Batchelder.
Inventors
W. H. Brown
J. E. Truckses
by Miller Brown & Quimby
Attys.

No. 768,875. Patented August 30, 1904.

UNITED STATES PATENT OFFICE.

WALTER H. BROWN, OF EAST BOSTON, AND JOHN E. TRUCKSES, OF CHARLESTOWN, MASSACHUSETTS.

LIQUID-DIRECTING DEVICE.

SPECIFICATION forming part of Letters Patent No. 768,875, dated August 30, 1904.

Application filed September 17, 1903. Serial No. 173,527. (No model.)

*To all whom it may concern:*

Be it known that we, WALTER H. BROWN, of East Boston, and JOHN E. TRUCKSES, of Charlestown, in the county of Suffolk and State of Massachusetts, have invented certain new and useful Improvements in Liquid-Directing Devices, of which the following is a specification.

This invention relates to a liquid-directing device designed particularly for use in connection with apparatus for mixing air and a combustible gas in predetermined proportions and supplying the same under pressure for use in heating, lighting, &c., such as in our Patent No. 748,840, granted January 5, 1904.

The invention has for its object to provide a simple, durable, and effective device of this character; and it consists in the improvements which we will now proceed to describe and claim.

Of the accompanying drawings, forming a part of this specification, Figures 1 and 2 represent enlarged elevations, partly in section, illustrating our invention. Fig. 3 represents a side view of the cock-plug detached. Fig. 4 represents a section on line 4 4 of Fig. 3. Fig. 5 represents a section on line 5 5 of Fig. 3.

The same reference characters indicate the same parts in all the figures.

In the drawings, $k$ represents a conduit, through which liquid is discharged by the liquid-directing device to apparatus such as shown in said patent. Said device comprises the casing $m$ of a three-way cock, in which is a movable plug member $n$. The cock-casing $m$ has three branches 2, 3, and 4. The branch 3 is double-acting or serves to conduct liquid from and to the casing and is connected with the conduit $k$. The branch 2 conducts liquid to the casing from a supply-pipe $o$, communicating with a source of supply of water or other fluid under pressure. The branch 4 conducts liquid from the casing to a waste-pipe $p$. The plug $n$ is cylindrical and is provided with two offset peripheral grooves $n'$ $n^2$, Figs. 1, 2, and 3. Said grooves are separated at one side of the plug by an elongated portion $n^3$ of the periphery of the plug and at the opposite side by a shorter portion $n^4$ of said periphery, the elongated portion $n^3$ being formed to act as a valve which alternately closes the branches 2 and 4, as hereinafter described. The offset grooves $n'$ $n^2$ are so formed and arranged that when the plug is at one extreme of its movement the groove $n'$ coincides with the branches 2 and 3, as shown in Fig. 1, so that water from the supply-pipe $o$ can pass through the cock-casing to the conduit $k$, the branch 4, leading to the waste-pipe $p$, being at this time shut off from the branches 2 and 3 by the valve portion $n^3$ of the plug $n$.

$n^5$ represents a groove or port formed in the upper end of the valve portion $n^3$ and arranged to connect the offset groove $n^2$ with the outlet branch 4 when the plug is in the position shown in Fig. 1. Provision is thus made for the escape to the waste-pipe of water that may find its way upwardly between the plug and casing, said water being thus prevented from escaping from the upper end of the casing.

$r$ represents a weighted lever pivoted at $r'$ to a fixed support and having a segmental slot $r^2$ in one of its arms, said slot receiving a pin $n^6$, connected with the stem of the plug $n$. The said lever has another arm, to which is pivotally connected the lower end of a vertical rod $s$, which may be lifted to depress the plug $n$, as shown in Fig. 2, or depressed to cause a movement of the lever $r$ in the direction required to raise the plug $n$, as shown in Fig. 1. When the plug is depressed, its offset groove $n'$ is moved out of connection with the branches 2 and 3 of the cock-casing, and its offset groove $n^2$ is brought into connection with the branches 4 and 3, as shown in Fig. 2. The inlet branch 2 is now closed by the valve portion $n^3$ of the periphery of the plug, and the branch 3 is connected, through the groove $n^2$, with the outlet branch 4 and the waste-pipe $p$, so that the fluid which has been forced through the conduit $k$ into a suitable receiver or cylinder may return and escape through the conduit $k$ and waste-pipe $p$.

The segmental slot $r^2$ is concentric with the pivot $r'$, on which the lever $r$ swings, so that the lever is loosely engaged with the cock-plug and can swing a distance equal to the length of the slot before moving the plug. The loose connection afforded by the slot $r^2$ therefore enables the lever to swing past its vertical position and begin to swing downwardly by gravitation before moving the plug, so that the plug is moved quickly in each direction by the momentum of the falling weight.

To permit the plug $n$ to move freely to its lowest position (shown in Fig. 2) without being obstructed by the water below it, we provide a passage 25, connecting the lower portion of the plug-chamber in the casing $m$ with the outlet branch 4, so that as the plug descends it forces the water below it out through the passage 25.

We claim—

1. A liquid-directing device comprising a three-way-cock casing adapted to be connected with a conduit and having an inlet adapted to be connected with a source of supply of fluid under pressure, and having also an outlet; a cock-plug movable longitudinally in said casing and having two offset peripheral grooves separated at one side of the plug by an elongated valve portion; said grooves being formed to connect the conduit alternately with the said inlet and outlet.

2. A liquid-directing device comprising a three-way-cock casing having at one side an inlet branch and an outlet branch, and at the opposite side a double-acting branch serving both as an inlet and an outlet, and a cock-plug longitudinally movable in said casing and having two offset peripheral grooves separated at one side of the plug by an elongated valve portion adapted to cover the inlet and the outlet branch alternately.

3. A liquid-directing device comprising a three-way-cock casing having at one side an inlet branch and an outlet branch, and at the opposite side a double-acting branch serving both as an inlet and an outlet, and a cock-plug longitudinally movable in said casing and having two offset peripheral grooves separated at one side of the plug by an elongated valve portion adapted to cover the inlet and the outlet branch alternately, the casing having a passage connecting its inner end with the outlet branch.

4. A liquid-directing device comprising a three-way-cock casing having at one side an inlet branch and an outlet branch, and at the opposite side a double-acting branch serving both as an inlet and an outlet, and a cock-plug longitudinally movable in said casing and having two offset peripheral grooves separated at one side of the plug by an elongated valve portion adapted to cover the inlet and the outlet branch alternately, the valve portion of the plug having a groove arranged to connect one of the offset grooves with the outlet branch.

In testimony whereof we have affixed our signatures in presence of two witnesses.

WALTER H. BROWN.
JOHN E. TRUCKSES.

Witnesses:
C. F. BROWN,
E. BATCHELDER.